(12) United States Patent
Hsu

(10) Patent No.: US 7,728,884 B2
(45) Date of Patent: Jun. 1, 2010

(54) METHOD FOR WHITE BALANCE ADJUSTMENT AND DIGITAL IMAGE CAPTURING DEVICE USING THE SAME

(75) Inventor: Hsin-Hung Hsu, Taipei (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 694 days.

(21) Appl. No.: 11/638,364

(22) Filed: Dec. 14, 2006

(65) Prior Publication Data

US 2008/0024622 A1      Jan. 31, 2008

(30) Foreign Application Priority Data

Jul. 28, 2006   (TW) ............................... 95127653 A

(51) Int. Cl.
*H04N 9/73*     (2006.01)
(52) U.S. Cl. ................................. 348/223.1
(58) Field of Classification Search ............. 348/223.1, 348/655, 224.1, 371; 396/61, 176
See application file for complete search history.

(56) References Cited

U.S. PATENT DOCUMENTS

| 5,568,194 A | 10/1996 | Abe |
| 2004/0120575 A1 | 6/2004 | Cheng |
| 2005/0195290 A1* | 9/2005 | Takeshita ................. 348/223.1 |

\* cited by examiner

*Primary Examiner*—David L Ometz
*Assistant Examiner*—Akshay Trehan
(74) *Attorney, Agent, or Firm*—Zhigang Ma

(57) ABSTRACT

The present invention provides a white balance adjustment method and a digital image capturing device using the same. The method according to the present invention comprises the following steps: capturing an image; partitioning the image into one or more blocks; obtaining a first brightness value of each block; obtaining a second brightness value, a R value, a G value and a B value of each block; determining whether each block is a gray block according to the difference value between the first brightness and the second brightness values, the R value, the G value and the B value; and determining whether to proceed with a first white balance procedure or a second white balance procedure according to the quantity of the gray block(s).

10 Claims, 3 Drawing Sheets

|   | 1 | 2 | 3 | 4 | 5 | 6 | 7 | 8 |
|---|---|---|---|---|---|---|---|---|
| 1 | B1 | B9 | B17 | B25 | B33 | B41 | | |
| 2 | B2 | B10 | B18 | B26 | B34 | B42 | | |
| 3 | B3 | B11 | B19 | B27 | B35 | B43 | | |
| 4 | B4 | B12 | B20 | B28 | B36 | B44 | | |
| 5 | B5 | B13 | B21 | B29 | B37 | B45 | | |
| 6 | B6 | B14 | B22 | B30 | B38 | B46 | | |
| 7 | B7 | B15 | B23 | B31 | B39 | B47 | | |
| 8 | B8 | B16 | B24 | B32 | B40 | B48 | | |

FIG.3

METHOD FOR WHITE BALANCE ADJUSTMENT AND DIGITAL IMAGE CAPTURING DEVICE USING THE SAME

BACKGROUND OF THE INVENTION

1. Field of Invention

The present invention relates to a white balance adjustment method and a digital image capturing device using the same, and more particularly, to a white balance adjustment method that utilizes the brightness difference.

2. Description of the Related Art

Generally speaking, the colors that reflect off an object will depend on the color of the light sources. The human brain is able to detect and correct this type of color change. Whether it is a sunny day, a cloudy day, in a room with light bulbs or fluorescent lamps, the human eye can adapt to the changes in color under different light sources and it will not affect the way in which humans perceive white objects. However, the "white color" generated by different light sources is perceived differently by a digital image capturing device. For example, a photo tends to be yellowish if it is taken in a room illuminated with tungsten lamps (light bulbs), and it tends to be lightly bluish or reddish if it is taken in other environments.

In order to make the colors in the photos be consistent with the colors perceived by the human eye, the digital image capturing device has to mimic the human brain and adjust the colors according to the light source. It has to define the white color so that in the photos it is the same as the white color perceived by the human eyes. This type of adjustment is known as "white balance".

Even though at present, the digital image capturing devices may automatically perform white balance adjustments in view of the located environment, it usually define the gray color by obtaining the red (R), green (G) and blue (B) values and does not take the effect of a flash into consideration. Actually, the brightness of the flash will affect the white balance such that the digital image capturing device will not be able to display the image colors at its best.

Therefore, by providing a white balance adjustment method that takes into consideration the effect of the flash on the white balance, the digital image capturing device using the white balance adjustment method of the present invention will be able to display color images with better image qualities.

SUMMARY OF THE INVENTION

In order to resolve the aforementioned problems in precedent technologies, the present invention provides a white balance adjustment method and a digital image capturing device using the same.

The digital image capturing device of the present invention comprises: a processor; an image capturing module and a flash. The image capturing module and the flash are electronically connected with the processor respectively. Moreover, the processor, the image capturing module and the flash are configured to achieve the white balance adjustment.

In one of the embodiments of the present invention, the white balance adjustment method comprises the following steps: capturing an image; partitioning the image into at least one block; obtaining a first brightness value of each block before the flash is activated; obtaining a second brightness value, a red (R) value, a green (G) value and a blue (B) value of each block after the flash is activated; determining whether each block is a gray block according to a difference value between the first and the second brightness values, the R value, the G value and the B value of each block; and determining whether to proceed with a first white balance procedure or a second white balance procedure according to a quantity of the gray block(s). The first white balance procedure takes the effect of the flash into consideration and the second white balance procedure does not take the effect of the flash into consideration.

BRIEF DESCRIPTION OF THE DRAWINGS

FIG. 3 is a schematic diagram showing the partition of an image.

DETAILED DESCRIPTION OF THE PREFERRED EMBODIMENT

The advantages and innovative features of the invention will become more apparent from the following detailed description when taken in conjunction with the accompanying drawings.

Figure 1:
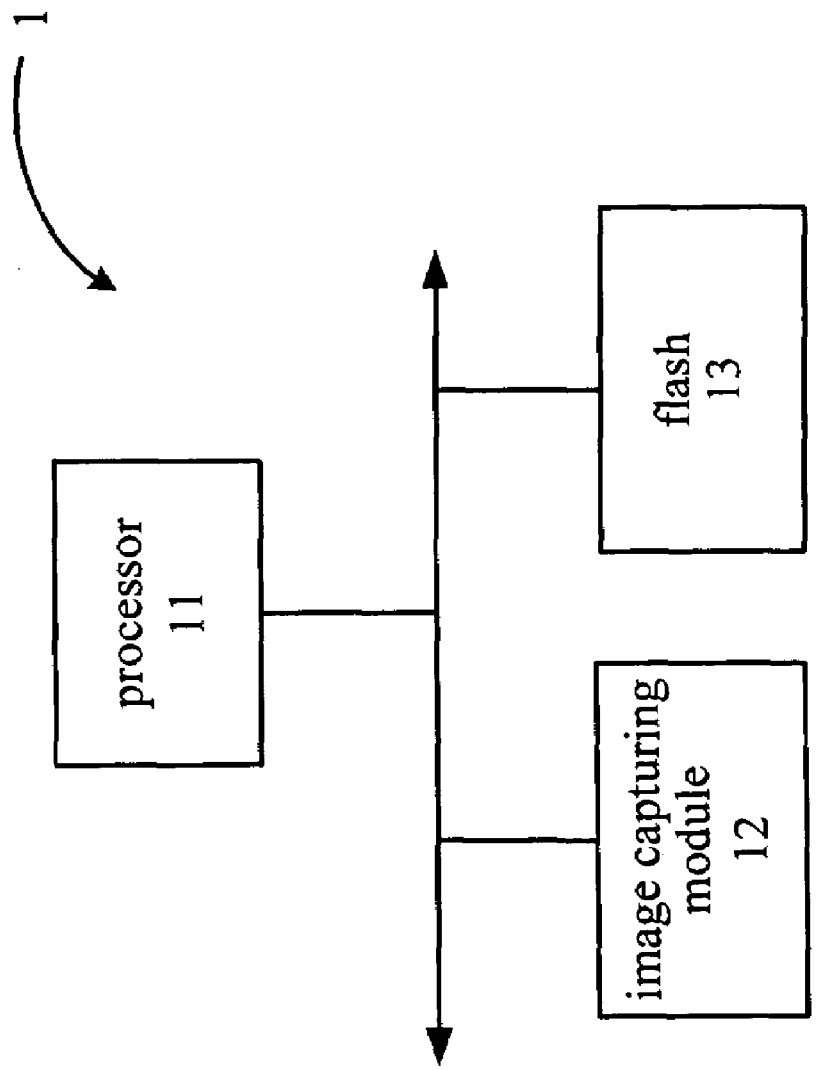
FIG. 1 is a system block diagram of a digital image capturing device in accordance with the present invention

First, with reference to FIG. 1, there shows a system block diagram of a preferred embodiment of the present invention. As indicated in FIG. 1, the embodiment provides a digital image capturing device 1, which comprises a processor 11, an image capturing module 12 and a flash 13. The image capturing module 12 and the flash 13 are electronically connected to the processor 11 respectively. Furthermore, the processor 11, the image capturing module 12 and the flash 13 are configured to perform the white balance adjustment method as illustrated below.

Figure 2:
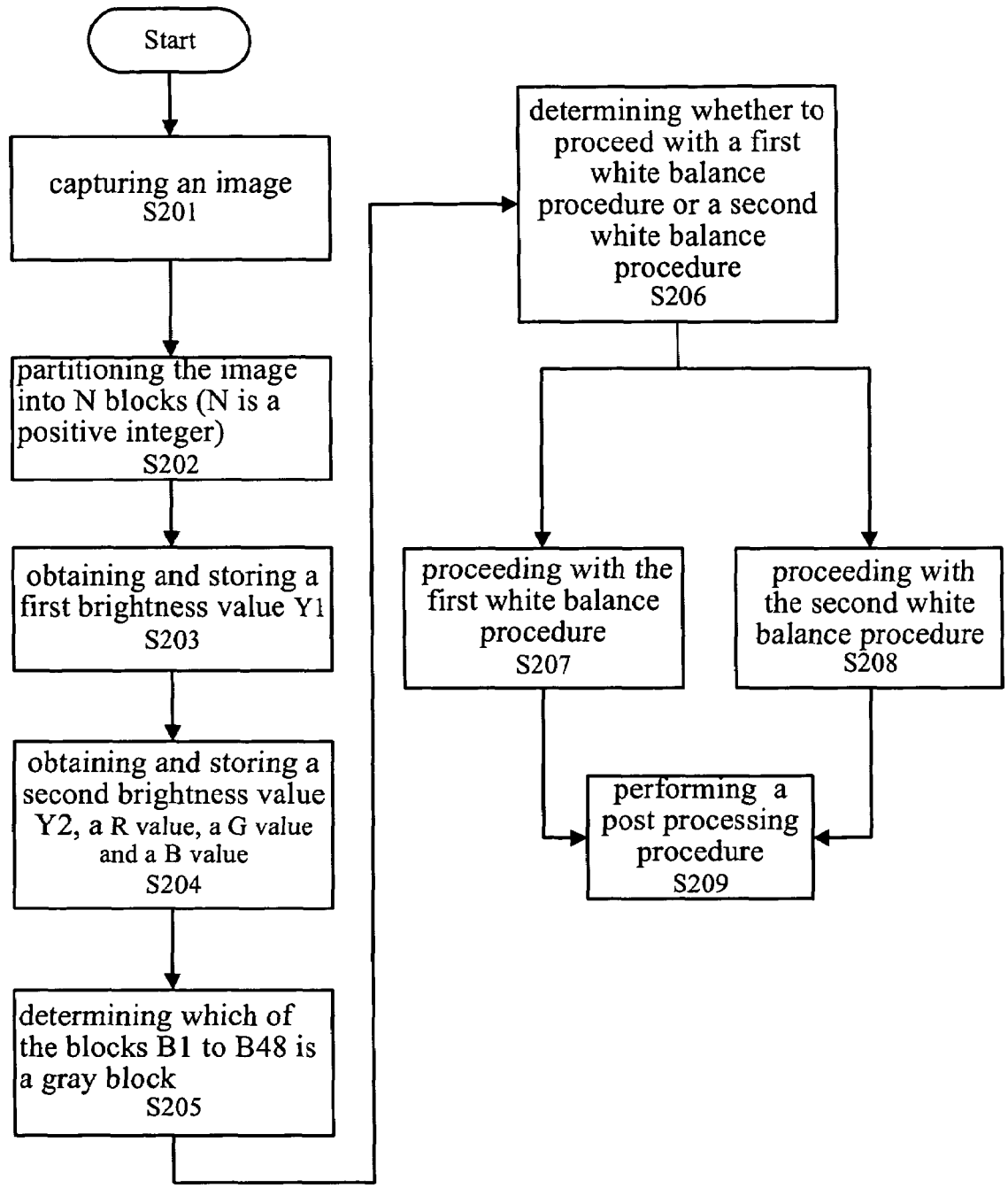
FIG. 2 is a flow chart showing the white balance adjustment method in accordance with the present invention.

With reference to FIG. 2, which is a flow diagram showing the preferred embodiment of the white balance adjustment method of the present invention. As shown in FIG. 2, the method of the preferred embodiment comprises steps S201, S202, S203, S204, S205, S206, S207, S208 and S209. These steps will be explained in detail in the following.

As shown in FIG. 2, the preferred embodiment commences with the step S201, which captures an image by the image capturing module 12 as shown in FIG. 1.

Next, step S202 is carried out and the image is partitioned into N blocks; wherein N is a positive integer. For example, as shown in FIG. 3, the image is partitioned into 48 blocks (8×6) denoted as B1 to B48. Take note that FIG. 3 is merely an example for illustration and the partition of the image by the present invention is not only confined to this arrangement.

Afterwards, the first brightness value (Y1) of each of the blocks (B1-B48) before the flash has been activated is obtained and stored in step S203. The brightness value (Y1) in the preferred embodiment of the present invention is derived from the R, G and B values of each block. Due to the fact that persons skilled in the art of white balance adjustment are familiar with the actual calculations of the brightness and color values, it will not be explained further here.

After that, the second brightness value (Y2) of each of the blocks (B1-B48) after the flash has been activated is obtained and stored in step S204. The R, G and B values of each individual block (B1-B48) are also stored simultaneously. In one of the preferred embodiment of the present invention, the second brightness value (Y2) is derived by calculating the R, G, and B values obtained from each of the blocks B1-B48 after the flash has been activated.

Next, in step S205, determine which of the blocks B1 to B48 is a gray block. It is achieved through analyzing D, the difference value between the first brightness value Y1 and the second brightness value Y2 (D=Y2−Y1), as well as the R, G and B values before the flash is activated.

In the preferred embodiment of the present invention, step S205 is carried out by the following steps:

1) determine whether a R/G ratio of the R value to the G value falls within a first predetermined range.

2) determine whether a B/G ratio of the B value to the G value falls within a second predetermined range.

3) Determine whether the difference value D is greater than a first threshold value. If the R/G ratio obtained from any blocks B1~B48 lies within the first predetermined range, the B/G ratio lies within the second predetermined range, and the difference value D is larger than the first threshold value, then the block is defined as a gray block. As shown in FIG. 3, blocks B10, B35, B21, B31 and B24 complies with the definition of a gray block.

Afterwards, in step S206, determine whether to proceed with a first white balance procedure (S207) or a second white balance procedure (S208) according to the quantity of the gray block(s) obtained in step S205. Furthermore, the first white balance procedure takes the effect of a flash into consideration, and the second white balance procedure does not take the effect of a flash into consideration.

Moreover, in the proceeding of the first white balance procedure, the R, G and B values are used to calculate the gain values for the R, G and B values respectively by a predetermined white balance calculation procedure, and then these gain values are used to adjust the original R, G and B values in order to achieve the white balance adjustment. Similarly, in the second white balance procedure of the preferred embodiment, R, G and B values are obtained before the flash is activated. The R, G and B values are calculated from another predefined white balance calculation procedure, and these respective gain values are then used to adjust the original R, G and B values to achieve white balance. Due to the fact that white balance procedures and its incremental calculations are widely known, this will not be explained in further detail.

In step S206, the preferred embodiment of the present invention will decide to execute step S207 to proceed with the first white balance procedure (which consider the effect of a flash) if the quantity of the gray blocks is greater than a second threshold value. Conversely, the preferred embodiment will decide to execute step S208 to proceed with the second white balance procedure (which does not consider the effect of a flash) if the quantity of the gray blocks is less than the second threshold value.

Lastly, after the completion of step S207 or S208, the present embodiment continues with step S209 to perform a post processing procedure of the image.

Although the present invention has been explained in relation to its preferred embodiment, it is to be understood that many other possible modifications and variations can be made without departing from the spirit and scope of the invention as hereinafter claimed.

What is claimed is:

1. A white balance adjustment method for a digital image capturing device having a flash, the method comprising the steps of:
   capturing an image;
   partitioning the image into at least one block;
   obtaining a first brightness value of each block before the flash is activated;
   obtaining a second brightness value, a red (R) value, a green (G) value and a blue (B) value of each block after the flash is activated;
   determining whether each block is a gray block according to a difference value between the first and the second brightness values, the R value, the G value and the B value of each block; and
   determining whether to proceed with a first white balance procedure or a second white balance procedure according to a quantity of the gray block(s).

2. The method as claimed in claim 1, wherein the first white balance procedure takes the effect of the flash into consideration; whereas the second white balance procedure does not take the effect of the flash into consideration.

3. The method as claimed in claim 1, wherein the step of determining whether each block is a gray block further comprises the steps of:
   determining whether a R/G ratio of the R value to the G value falls within a first predetermined range;
   determining whether a B/G ratio of the B value to the G value falls within a second predetermined range;
   determining whether the difference value is greater than a first threshold value; and
   if the R/G ratio falls within the first predetermined range, the B/G ratio falls within the second predetermined range, and the difference value is greater than the first threshold value, then defining the block as a gray block.

4. The method as claimed in claim 1, wherein the step of determining whether to proceed with a first white balance procedure or a second white balance procedure further comprises the steps of:
   determining whether the quantity of the gray block(s) is greater than a second threshold value; and
   if the quantity of the gray block(s) is greater than the second threshold value, then proceeding with the first white balance procedure.

5. The method as claimed in claim 1, wherein a gain value calculated from the R value, the G value and the B value of each gray block is used in the proceeding of the first white balance procedure.

6. A digital image capturing device comprising:
   a processor;
   an image capturing module electronically connecting with the processor; and
   a flash electronically connecting with the processor, wherein the processor, the image capturing module, and the flash are configured to achieve the following mechanism:
   capturing an image;
   partitioning the image into at least one block;
   obtaining a first brightness value of each block before the flash is activated;
   obtaining a second brightness value, a red (R) value, a green (G) value and a blue (B) value of each block after the flash is activated;
   determining whether each block is a gray block according to a difference value between the first and the second brightness values, the R value, the G value and the B value of each block; and
   determining whether to proceed with a first white balance procedure or a second white balance procedure according to a quantity of the gray block(s).

7. The digital image capturing device as claimed in claim 6, wherein the first white balance procedure takes the effect of the flash into consideration, whereas the second white balance procedure does not take the effect of the flash into consideration.

8. The digital image capturing device as claimed in claim 6, wherein the processor further has the following mechanisms:

determining whether a R/G ratio of the R value to the G value falls within a first predetermined range;

determining whether a B/G ratio of the B value to the G value falls within a second predetermined range;

determining whether the difference value is greater than a first threshold value; and if the R/G ratio falls within the first predetermined range, the B/G ratio falls within the second predetermined range, and the difference value is larger than the first threshold value, then defining the block as a gray block.

9. The digital image capturing device as claimed in claim 6, wherein the processor further has the following mechanisms:

determining whether the quantity of the gray block(s) is greater than a second threshold value; and if the quantity of the gray block(s) is greater than the second threshold value, then proceeding with the first white balance procedure.

10. The digital image capturing device as claimed in claim 6, wherein an gain value calculated from the R value, the G value and the B value of each gray block is used in the proceeding of the first white balance procedure.

* * * * *